United States Patent [19]

Campbell et al.

[11] Patent Number: 5,135,768
[45] Date of Patent: Aug. 4, 1992

[54] NON-DAIRY CREAMS AND PROCESS OF MAKING

[75] Inventors: Iain J. Campbell; Wayne G. Morley, both of Northants, United Kingdom

[73] Assignee: Van den Bergh Foods Co., Division of Conopco, Inc., Lisle, Ill.

[21] Appl. No.: 640,652

[22] Filed: Jan. 14, 1991

[30] Foreign Application Priority Data

Jan. 12, 1990 [GB] United Kingdom ............... 9000701

[51] Int. Cl.$^5$ .................. A23D 9/00; A23C 11/02
[52] U.S. Cl. .................. 426/602; 426/570; 426/580; 426/585; 426/604
[58] Field of Search ............ 426/580, 585, 570, 604, 426/602

[56] References Cited

U.S. PATENT DOCUMENTS

| | | | |
|---|---|---|---|
| 746,502 | 12/1903 | Hall | 426/585 |
| 3,620,757 | 11/1971 | Ellinger | 426/570 |
| 3,883,670 | 5/1975 | Pennings et al. | 426/151 |
| 4,046,926 | 9/1977 | Gardiner | 426/585 |
| 4,107,343 | 8/1978 | Petricca | 426/570 |
| 4,199,608 | 4/1980 | Gillmore et al. | 426/570 |
| 4,325,979 | 4/1982 | Trop et al. | 426/570 |

FOREIGN PATENT DOCUMENTS

| | | |
|---|---|---|
| 1053094 | 12/1966 | United Kingdom . |
| 1353096 | 5/1974 | United Kingdom . |
| 1432364 | 4/1976 | United Kingdom . |
| 1500427 | 2/1978 | United Kingdom . |
| 2061692 | 5/1981 | United Kingdom . |

Primary Examiner—Jeanette Hunter
Assistant Examiner—Helen Pratt
Attorney, Agent, or Firm—A. Kate Huffman

[57] ABSTRACT

The invention concerns non-dairy creams that comprise the usual compounds: water, vegetable fat, milk component and emulsifier, preferably a caseinate. Although the concentration ratio $B/C^2$ (B=milk component, C=emulsifier) in these NDC's is high the viscosity of these NDC's is still less than 150 mPa s. Also a process is disclosed for the preparation of these NDC's, in which a specific order of processing steps is essential.

14 Claims, 2 Drawing Sheets

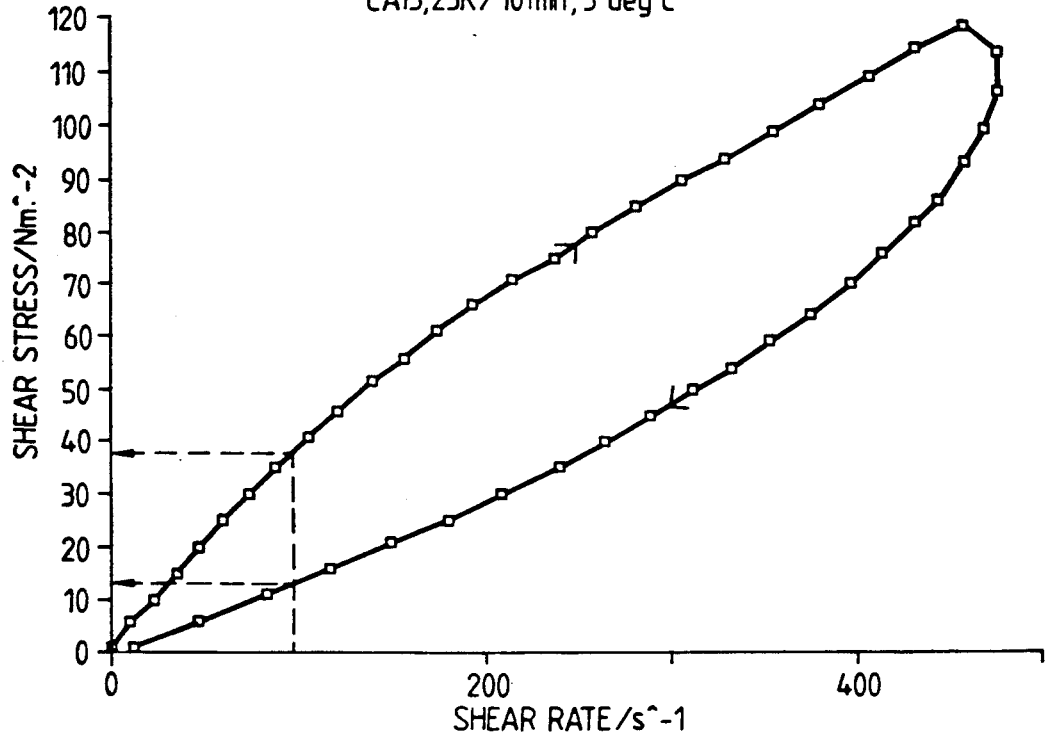
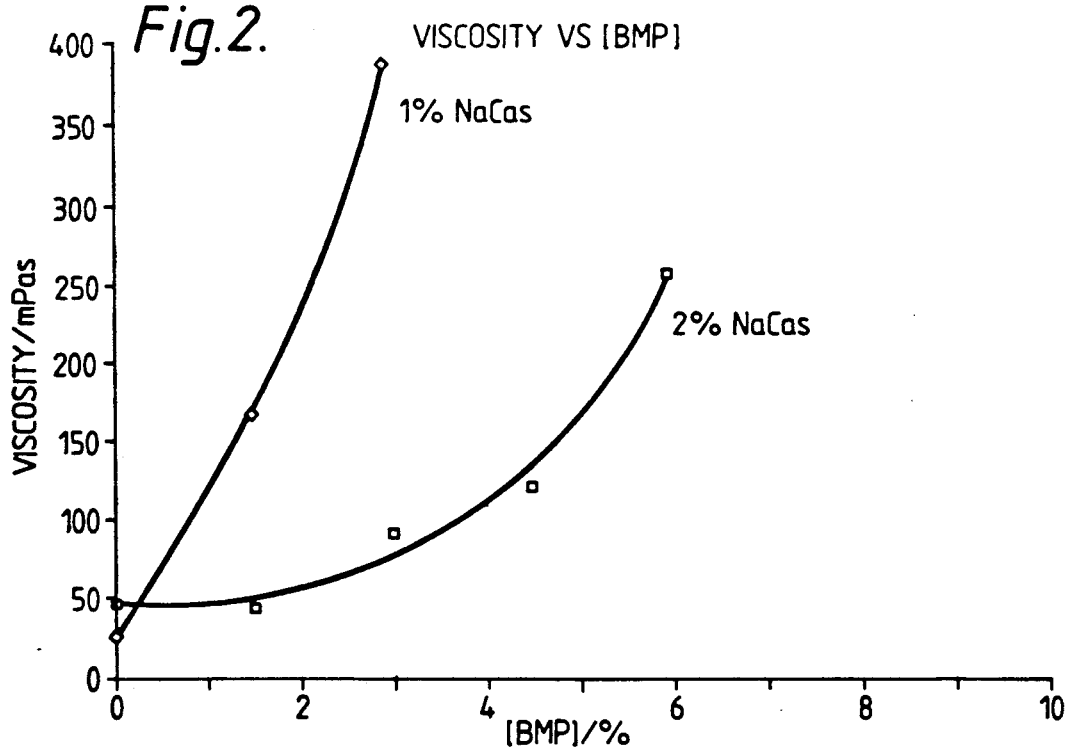

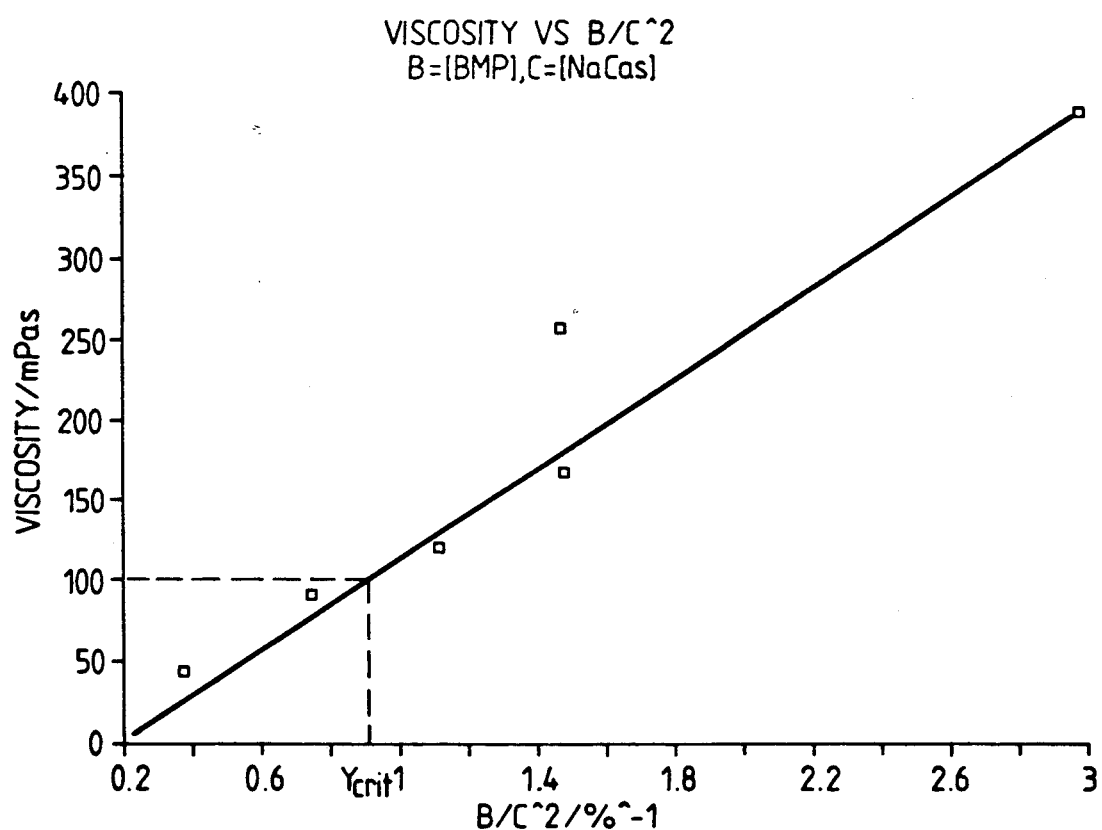

NON-DAIRY CREAMS AND PROCESS OF MAKING

Non-dairy creams, based on vegetable fats are already known in the literature, cf e.g. U.S. Pat. No. 4,199,608 or U.S. Pat. No. 4,107,343. These creams may possess a high viscosity and/or an unacceptable taste. In order to improve the taste it has been suggested to add a component of milk, for example buttermilk powder to the NDC's. However the use of a component of milk, so far, has enhanced the viscosity of the NDC's. A high viscosity however is often undesirable e.g. in coffee creams. The high viscosity is caused by the clustering of oil droplets during the last stages of the processing of the NDC's. When high ratios of milk component to emulsifier (for example caseinate) are used, very heavily clustered creams may be obtained. These creams may block the pipework and other sections of the plant. This might become so severe, that the whole plant has to be shut down and the equipment cleaned thoroughly. We have now found a NDC which combines a relatively high level of milk component in the NDC with a low viscosity of the NDC. So our invention in the first place concerns a NDC, comprising an emulsion of vegetable fat(s) and water, an emulsifier and a component of milk, wherein the NDC contains 0.1–10 wt % emulsifier and 0.1–15 wt % of the component of milk (on dry basis), whereas the ratio between the concentration component of milk (=B) and the concentration emulsifier (=C), both as wt %, is such that $B/C^2$ is greater than a critical value Ycrit and the viscosity at 100 s$^{-1}$ is less than 150 mPa s, wherein the critical value Ycrit is determined by the emulsifier used and is obtained from a graph in which the viscosity is plotted against $B/C^2$, in which Ycrit is that value for $B/C^2$ which according to that graph results in a viscosity of 100 mPa s at 100 s$^{-1}$.

Examples of components of milk, that can be used are: buttermilk powder, whole milk powder, skimmed milk powder, butter serum powder, but also buttermilk, skimmed milk, whole milk and butterserum and mixtures of these. Buttermilk powder is the most preferred of these milk components. These components of milk might contain some caseine, but this caseine is not incorporated in the term C in the ratio $B/C^2$.

All the known emulsifiers can be incorporated in our NDC's, e.g. caseinates, lecithins and monoglycerides. However we prefer to use a caseinate as emulsifier.

NDC's according to the above mentioned criteria are stable, have a low viscosity and a good taste and are processable without the danger of clustering. They can be used as such, e.g. as whipped cream or coffee creamer.

When a caseinate is used as emulsifier Ycrit is 1.0, as will be illustrated later. In that case the value for the ratio $B/C^2$ in these creams is preferably more than 2.0, most preferably more than 3.0.

The viscosity of these creams is preferably below 100 m Pa.s at a shear of 100 s$^{-1}$.

Useful vegetable fats for the NDC's according to the invention are palmkernel, coconut, babasu, ouricurum, murumuru, tucum, cocoabutter, sunflower, safflower, rapeseed, soy, maize, peanut and cottonseed oil, as well as their hydrogenated products.

Part of these fats might be replaced by known fat replacers, like SPE's or denatured proteins Examples of these fat replacers are described in e.g. U.S. Pat. No. 3,600,186; EP 235,836 corresponding to U.S. Pat. 4,952,687; EP 236,288; corresponding to U.S. Pat. No. 4,720,346 and 4,759,856 EP patent application 88201237 and EP patent application 90201829 corresponding to U.S. Pat. No. 4,980,353 and 4,981,854.

Preferred fats ar hardened palm kernel oil, coconut oil and sunflower oil.

Any caseinate can be used as emulsifier. Preferably the caseinate is used in the form of salts of group I$^A$ and II$^A$ metals, espec. Li$^+$, Na$^+$, Ca$^{2+}$ and Mg$^{2+}$, most preferably Na$^+$.

The amount of emulsifier can vary between 0.1 and 10 wt %, although higher and lower amounts can also be used. The amount of the preferred Na-caseinate is 1–5 wt %.

The amount of milk component varies between 0.1 and 15 wt %, but also lower and higher quantities can be used. The preferred amount of milk component is 1–10 wt % (on dry basis).

The viscosity of the NDC is a measure for the amount of clustering, present in the NDC. This viscosity is measured by measuring shear rates as a function of shear stress, whereby the stress is increased linearly with the time to a certain value, whereupon the stress is decreased again to zero.

BRIEF DESCRIPTION OF THE DRAWINGS

This way a graph is obtained, consisting of two lines, one for increasing stress and the other for decreasing stress. FIG. 1 gives an illustration of this phenomenon, herein shear stress is plotted versus shear rate for an arbitrary NDC. This NDC contains Na-caseinate as emulsifier and buttermilk powder as milk component. The viscosity at a predetermined shear rate can be calculated by determining the ratio between shear stress and shear rate.

FIG. 2 shows a graph in which the viscosity of the above mentioned NDC is plotted versus the level of buttermilk powder as milk component (=B) for creams containing 1% and 2% Na-caseinate resp as emulsifier. This graph shows the influence of the amount of emulsifier and milk component on the viscosity of the NDC's. From this graph it can be concluded that increasing the ratio of milk component to emulsifier enhances the viscosity of an arbitrary NDC that is processed in the normal way. Plotting viscosity versus $B/c2$ (B=concentration of milk component, C = concentration of emulsifier) for these NDC's results in a straight line, as shown in FIG. 3. It should be noted, that FIG. 3 accounts for a system in which Na-caseinate is used as emulsifier, when another emulsifier is used another straight line is obtained, which results in another value for Ycrit.

FIG. 3 shows, that the critical value Ycrit for $B/C^2$ for a NDC, containing BMP as milk component and Na-caseinate as emulsifier is about 1.0 for NDC's processed in the usual way. Viscosities of less than 150 m.Pa s (at a shear rate of 100 s$^{-1}$) can only be obtained by making NDC's in which $B/c2$ is less than 1.3. We have now found new NDC's that combine a low viscosity (less than 150 mPa s) with a high ratio of $B/c2$ (above critical value Ycrit of 1.0).

The invention also concerns a process for the preparation of NDC's. In conventional processes for the production of NDC's the milk component is first dispersed in water, together with the water soluble emulsifier. The fat is added afterwards with the fat soluble emulsifiers. After homogenisation of the so obtained course emulsion an emulsion with small fat droplets is obtained. However during homogenisation, clustering of the droplets is largely unavoidable. We now have found a process, which results in a stable, non clustered NDC with good taste properties. In this process the milk component is added after homogenisation has been carried out. The buttermilk powder is thus admixed with the homogenised mixture of water, vegetable fat(s) and emulsifier.

The NDC so obtained can easily be processed, without homogenisation, to a low viscosity NDC that contains relatively high levels of milk component and which is sterile.

The invention will be illustrated by the following examples which however are not limitative for the invention:

EXAMPLE 1

An emulsion was made from 100 g Na-caseïnate in 5100 ml $H_2O$ and 4500 g of a 1:1 mixture of palm kernel oil (2250 g) and coconut oil (2250 g.) was added. This mixture was processed as normal, with a homogenisation pressure of 100 bar.

300 g buttermilk powder was then added to the homogenised mixture; without further homogenisation. The obtained cream was processed to a cream, that contained 22.5 % palm kernal oil, 22.5 % coconut oil 1% Na-caseïnate and 3% buttermilk powder ($B/C^2 = 3$).

The viscosity of the cream at 100 $s^{-1}$ was 53 mPa s.

COMPARATIVE EXAMPLE I

Addition of the buttermilk powder before homogenisation resulted in a cream with a viscosity at 100 $s^{-1}$ of 562 mPa s.

EXAMPLE II

A NDC was prepared in accordance with the procedure of example I, using 1% Na-caseïnate, 49,5% $H_2O$, 45% sunflower oil and 4.5 % buttermilk powder ($B/C^2 = 4.5$). This resulted in a NDC that had a viscosity at 100 $s^{-1}$ of 73 mPa s, and 9 mPa s at 10 $s^{-1}$.

COMPARATIVE EXAMPLE II

Example II was repeated, however using the sequence of steps of comp. ex. I.

This resulted in a product that had a viscosity at 100 $s^{-1}$ of greater than 674 mPa s and 540 mPa s at 10 $s^{-1}$.

We claim:

1. A non-dairy cream comprising:
a) an emulsion of vegetable fat or mixtures thereof and water;
b) 0.1–10 wt % of an emulsifier having a concentration of the emulsifier as wt % designated C; and
c) 0.1–15 wt % (on dry basis) of a component of milk having a concentration of the component of milk as wt % designated B.
wherein a ratio of the concentration of the component of milk B to the concentration of the emulsifier C is such that $B/C^2$ is greater than a critical value Ycrit and a viscosity at 100 $S^{-1}$ is less than 150 mPas, the critical value Ycrit is determined by the emulsifier used and is obtained from a graph in which the viscosity is plotted against $B/C^2$, and in which Ycrit is a value of $B/C^2$ resulting in a viscosity of 100 mPas at 100 $S^{-1}$ according to the graph.

2. Non-dairy cream according to claim 1, wherein the emulsifier is a caseinate and Ycrit is 1.0.

3. Non-dairy cream according to claim 1, wherein the ratio $B/C^2$ is more than 2.0.

4. Non-dairy cream according to claim 1, wherein the ratio $B/C^2$ is more than 3.0.

5. Non-dairy cream according to the claim 1, wherein the viscosity of the cream at 100 $s^{-1}$ is less than 100 m Pa s.

6. Non-dairy cream according to claim 1, wherein the vegetable fat is sunflower oil.

7. Non-dairy cream according to claim 1, wherein the vegetable fat is coconut oil.

8. Non-dairy cream according to claim 1, wherein the vegetable fat is a mixture of palm kernel oil and coconut oil.

9. Non-dairy cream according to claim 8 wherein the ratio of palm kernel oil and CO is 2:1–1:2.

10. Non-dairy cream according to claim 1, wherein the vegetable fat is palm kernel oil.

11. Non-dairy cream according to claim 1, wherein the amount of the component of milk is 1–10 wt %.

12. Non-dairy cream according to claim 1, wherein the component of milk is buttermilk powder.

13. Process for the preparation of non dairy creams by dispersing an emulsifier and vegetable fat in water, homogenizing the mixture, adding a component of milk to the homogenized mixture and processing the cream without further homogenization to a non-dairy cream, the non-dairy cream comprising:
a) an emulsion of vegetable fat or mixtures thereof and water;
b) 0.1 to 10 wt. % of an emulsifier having a concentration of the emulsifier as wt. % designated C; and
c) 0.14 15 wt.% (on dry basis) of a component of milk having a concentration of the component of milk as wt % designated B;
wherein a ratio of the concentration of the component of milk B to the concentration of the emulsifier C is such that $B/C^2$ is greater than a critical value Ycrit and a viscosity at $100S^{-1}$ is less than 150 mPas, the critical value Ycrit is determined by the emulsifier used and is obtained from a graph in which the viscosity is plotted against $B/C^2$, and in which Ycrit is a value of $B/C^2$ resulting in a viscosity of 100 mPas at $100S^{-1}$ according to the graph.

14. Process according to claim 13, wherein buttermilk powder is used as component of the milk, which is admixed without further homogenization with a homogenised mixture of water, vegetable fat and caseinate.

* * * * *

UNITED STATES PATENT AND TRADEMARK OFFICE
CERTIFICATE OF CORRECTION

PATENT NO. : 5,135,768

DATED : August 4, 1992

INVENTOR(S) : Iain J. Campbell, Wayne G. Morley

It is certified that error appears in the above-identified patent and that said Letters Patent is hereby corrected as shown below:

IN THE CLAIMS:

In claim 13, column 4, line 42, "0.14" should read --0.1--.

Signed and Sealed this

Fifth Day of October, 1993

BRUCE LEHMAN

Commissioner of Patents and Trademarks